United States Patent [19] [11] 4,258,404
Challet [45] Mar. 24, 1981

[54] FAIL-SAFE CONTROL CIRCUIT, PARTICULARLY FOR HEATING APPARATUS

[75] Inventor: Jacques Challet, Chambarel-Ceaux D'Allegre, France

[73] Assignee: Constructions Electriques R.V., Le Puy, France

[21] Appl. No.: 36,978

[22] Filed: May 8, 1979

[30] Foreign Application Priority Data

May 16, 1978 [FR] France ............................... 78 14437

[51] Int. Cl.$^3$ ............................................... H02H 3/08
[52] U.S. Cl. .................................... 361/156; 361/104; 361/205
[58] Field of Search ............... 361/104, 155, 156, 162, 361/205

[56] References Cited

U.S. PATENT DOCUMENTS

| | | | |
|---|---|---|---|
| 3,381,146 | 4/1968 | Egan | 361/156 X |
| 3,671,815 | 6/1972 | Eberle et al. | 361/162 |
| 4,138,708 | 2/1979 | Takeshima | 361/156 |

*Primary Examiner*—Harry E. Moose, Jr.
*Attorney, Agent, or Firm*—Larson, Taylor and Hinds

[57] ABSTRACT

A fail-safe control circuit for supplying the electrical power for operating a safety stop member, such as an electromagnetic valve, in response to low power information, wherein any failure of a component causes the safety stop member to close.

The energy taken from the alternative current supply network by the periodic charging of a capacitor is transmitted to a load by the energizing of a thyristor. The spontaneous energizing of the thyristor causes the appearance of an overcurrent disabling the device.

Applications to combustion, premises, medical monitoring devices.

6 Claims, 7 Drawing Figures

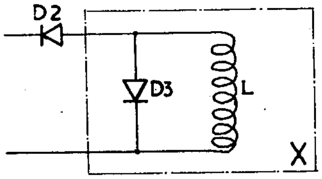
Fig.3a.
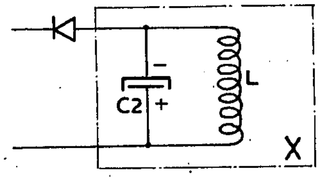
Fig.3b.
Fig.4.
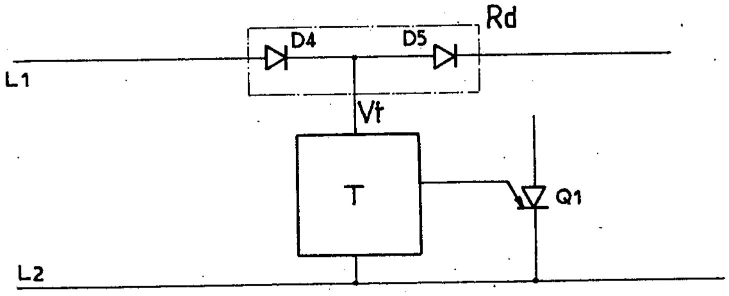
Fig.5.
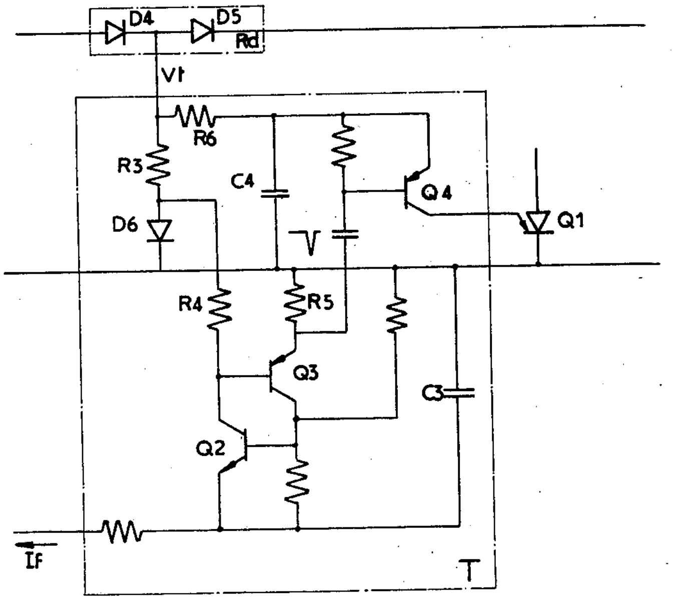

FAIL-SAFE CONTROL CIRCUIT, PARTICULARLY FOR HEATING APPARATUS

The present invention relates to a control circuit for supplying electrical energy for operating an external member in response to the application of a small control power, said circuit being of the fail-safe kind, that is to say that any failure of one of its components always causes the supply of energy to the external member to be interrupted.

Such a fail-safe feature is known and sought in applications concerning fields where the safety of persons and property is involved.

A preferred field of application is for example that of control circuits for heating apparatus fed with fluid fuels, where the intake of fuel is conditioned to the presence of a flame to avoid any risk of dangerous cumulation of the fuel. In such circuits, a control member (electromagnetic valve) is controlled by a circuit operated by a sensor detecting the existence of the flame. It is naturally arranged, for obvious safety reasons, that the intake of fuel is interrupted in the absence of a flame, but also when any abnormality is likely to disturb the operation of the monitoring device.

Such circuits are well known, as well as the imperfections which they may present.

First and foremost are known sequential circuits which, during an operating cycle, and generally before the flame production phase, introduce a self-checking phase during which the proper operation of all or part of the circuit is checked to suspend, if need be, the course of the cycle and the intake of fuel.

These circuits are most often supplied with DC current and control an intermediate electromagnetic relay controlling the switching on of the external member controlling the fuel intake. Failures of the relay—which is a mechanically operating device predisposed to wear and sensitive to vibrations—are to be particularly feared, and the self-checking phase comprises generally a check of the condition of the relay by means of an additional contact thereon. A major disadvantage of these DC operating circuits, and more generally of all static operating circuits is that any failure which would result in confirming the flame monitoring condition during normal running of this operation passes unnoticed, to be only detected later, if it still continues, during the next self-checking phase.

The result is that, on the one hand, the burner will continue its combustion cycle without real monitoring and that, on the other hand, if this failure is erratic, it risks not being detected and being frequently reproduced. This risk is all the more to be feared since this type of failure often results from overheating, to which these circuits are particularly exposed because of their proximity to a heat source.

These disadvantages are not unknown and have given rise to another category of circuits, dynamic, using a form of modulation of an electrical current (synchronous amplifiers, oscillators, samplers), which avoid using active electronic components as simple static switches. (It is obvious in fact that a failure of the short circuit or open circuit type may still simulate the operation of a switch).

These circuits are however complex, so expensive, and the power which they can deliver is generally limited, which reduces their field of use. French patent No. 2 238 393 of the applicant is one example thereof.

Other fields than that of controlling heating apparatus are also concerned by circuits of this type; this may be the case for monitoring premises against intrusions or fire, for signalling, for safety lighting, for medical monitoring apparatus, and in general for all the cases where it is preferable to sollicit human intervention, even needlessly, rather than risk leaving a situation to develop dangerous for life or property.

The essential aim of the present invention is to propose a fail-safe control circuit fed by an electrical distribution network, of the synchronous amplifier type, having rapid safety operation in case of the failure of one of its components.

Another aim of a circuit in accordance with the present invention is to supply directly the power for operating an external member, without use of an intermediate electromagnetic relay, so that there result additional advantages on the reliability and the cost of the circuit.

The invention, its features and its advantages will be better understood from reading the present description which follows and with the aid of the accompanying drawings in which.

Figure 1:
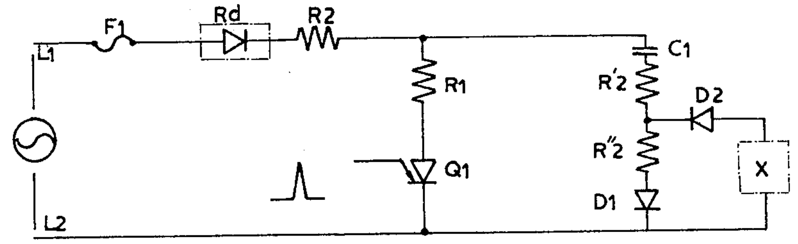
FIG. 1 shows the diagram of a thyristor control circuit in accordance with the invention.

FIGS. 3*a* and 3*b* show methods of connecting an external load to the circuit of FIG. 1;

FIG. 4 shows a simplified diagram of a rectifier circuit and a thyristor trigger circuit used together with the circuit of FIG. 1;

FIG. 5 shows an embodiment of a circuit for triggering the thyristor; and

Figure 6:
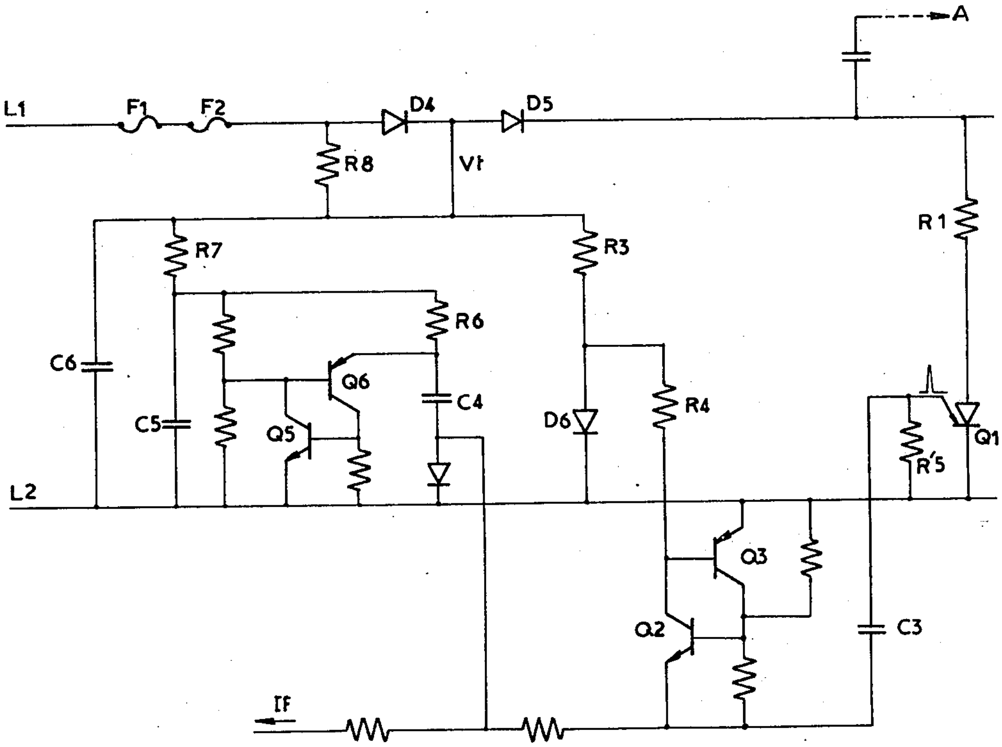

FIG. 6 shows a variation of this circuit.

The circuit shown in FIG. 1 comprises a capacitor-reservoir C1, charged by means of the distribution network during the half waves having the same polarity by a rectifier circuit Rd, and discharged, during the half waves having opposite polarity, into a load X, the discharge being effected by means of a thyristor Q1.

Two diodes $D_1$ and $D_2$ control respectively the flow of the charging and discharging currents of the capacitor-reservoir $C_1$; the conduction of thyristor $Q_1$ is controlled by means of pulses applied to its gate electrode during the half waves when the rectifier circuit Rd is not conducting, the discharge current of the capacitor-reservoir being limited by a resistance $R_1$ inserted in series with thyristor $Q_1$.

The circuit comprises furthermore a protection fuse $F_1$ inserted in one of the conductors connected to the supply network, the power of said fuse being chosen greater than the charging current of capacitor $C_1$, possibly limited by a resistor $R_2$, and less than the current which would flow, through $R_1$, $Q_1$ and possibly $R_2$, if thyristor $Q_1$ is energized during the half wave of the supply network during which the rectifier circuit Rd is conducting.

The operation of this circuit is the following: to avoid connecting load X with the network by means of a switch type circuit, the energy intended therefor is previously stored in the capacitor-reservoir $C_1$. The transfer of this energy to load X is provided, at each half wave of the supply network, by the energizing of thyristor $Q_1$.

However, it may be feared that, following deterioration of the characteristics of this thyristor $Q_1$ which would cause a reduction in its avalanche voltage, it might be energized spontaneously, even in the absence of control pulses. If such a failure arises, the normally low avalanche voltage of thyristor $Q_1$ will be reached, first of all, during charging of capacitor $C_1$, i.e. during the half wave of the supply network during which the rectifier circuit Rd is conducting. Under these circumstances, thyristor $Q_1$ will have passing therethrough a fault current supplied by the distribution network through circuit $F_1$, Rd, $R_1$ and possibly $R_2$.

It will be understood that the resistors $R_1$ and $R_2$ may be chosen with very low values, so that the ratio of the fault current to the normal operating current may be made as great as desired. Particularly, it may be arranged that fuse $F_1$ blows even if a single erratic triggering of thyristor $Q_1$ occurs during the charging of capacitor $C_1$. The discrimination of a fault may be made extremely straightforward and capable of absorbing very large tolerances on the value of the components or the supply voltage.

Resistor R2, whose role is to limit the energy supplied to fuse $F_1$ following the sudden charging of capacitor $C_1$ if the circuit is switched on at the time when a peak of supply voltage occurs, may have only a very low value so that $R_1$ is the leading component in adjusting the fault current. As a variation, other positions may be chosen for resistor $R_2$, where this resistor no longer plays a part in determining the fault current. Positions $R'_2$ or $R''_2$ satisfy this condition in the diagram of FIG. 1.

Figure 2:
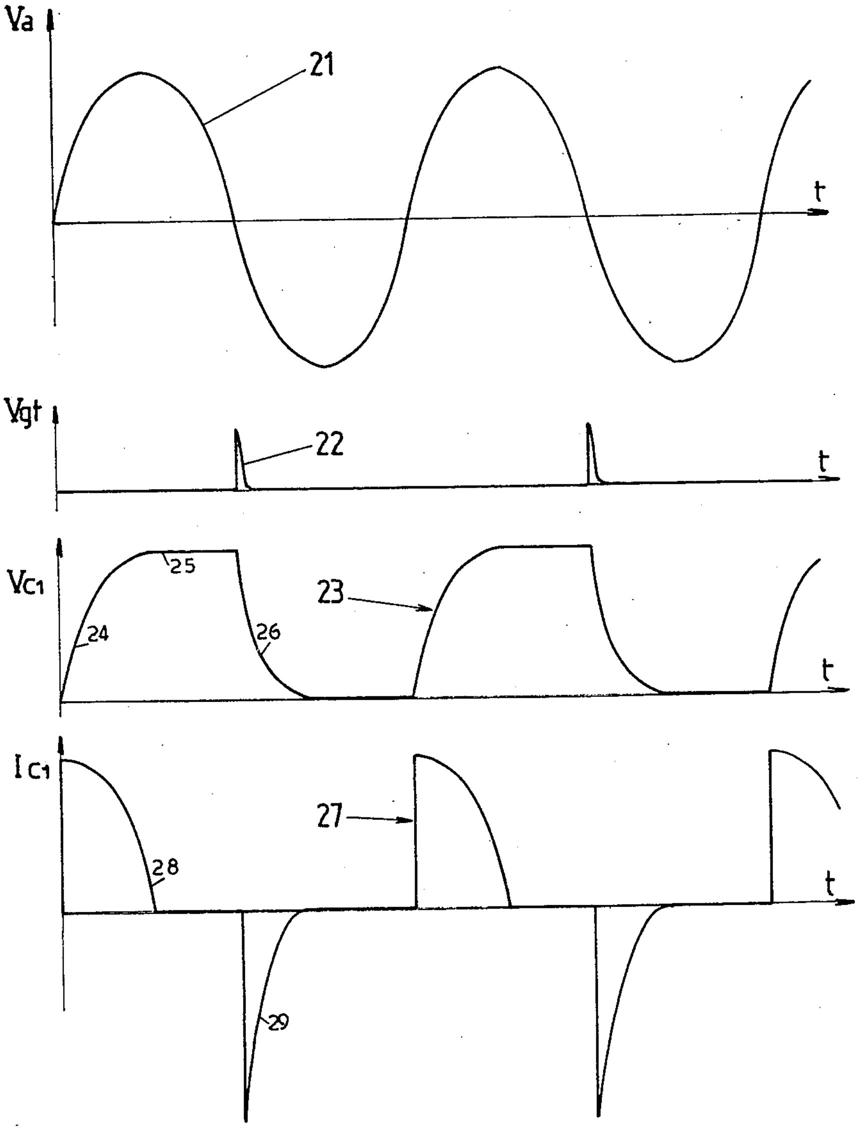
FIG. 2 shows the wave forms of the currents and voltages during normal operation of the circuit of FIG. 1.

FIG. 2 shows the wave form of the currents and voltages in this circuit, during normal operation, with a common time scale.

Curve 21 shows the wave form of the alternating supply voltage Va with respect to time; curve 22 the triggering voltage Vgt for thyristor $Q_1$, by means of pulses produced at the beginning of the negative half wave of curve 21; curve 23 shows the voltage Vc1 at the common point of resistor $R_1$ and capacitor $C_1$, which comprises:

- a portion (a quarter) 24 of the sinusoidal wave 21 during charging of capacitor $C_1$;
- a flat portion 25 during which the charging of capacitor $C_1$ is maintained;
- the exponential discharge 26 of capacitor $C_1$ by thyristor $Q_1$ through resistor $R_1$ and load X.

Curve 27 shows the wave form of the current Ic1 through capacitor $C_1$, composed of a quarter of a sinusoidal wave 28 during charging and a discharge exponential 29.

These wave forms may be substantially modified, particularly with respect to the nature of the impedance of load X.

In this connection, FIGS. 3*a* and 3*b* show two methods for constituting load X when it comprises an electromagnetic relay winding or, which is to be preferred, directly an electromagnetic valve winding.

FIG. 3*a* is particularly adapted to controlling a highly inductive load, where the current pulses coming from the periodic discharge of capacitor $C_1$ maintain flowing in winding L a DC current, which is closed through diode $D_3$ in the periods when diode $D_2$ is not conducting.

FIG. 3*b* shows more simply the supply to winding L of the DC voltage filtered by capacitor $C_2$; here, an electrolytic capacitor is shown, connected according to the polarity shown. This latter diagram is to be preferred if silent operation of load L is desired, free from humming at the frequence of the network which may appear with the diagram of FIG. 3*a*.

A principle in appearance close to that which has just been outlined is already known, for example from U.S. Pat. No. 3,671,815. It will however be noted that in this case the fault current, which does not depend on the overvoltage imposed on the load, cannot be adjusted independently thereof, so that the discrimination of the fault is uncertain and depends on the very close characteristics of the protection fuse.

Besides these means for controlling the application of electrical energy to a load X by means of a thyristor, or more generally by means of a switching member, in a fail-safe configuration, the invention also provides means for constructing the rectifier circuit Rd which, in association with the control circuit for thyristor $Q_1$, extend the fail-safe characteristics to the rectifier circuit Rd itself.

In fact, on the hypothesis that the rectifier circuit Rd is formed, in a normal way, of a simple diode, as shown symbolically in FIG. 1, it is seen that, in the case of failure of this diode through a short circuit, energy is permanently transmitted to load X even if the thyristor $Q_1$ is not energized. The current consumed in these circumstances will be greater than the nominal current and fuse $F_1$ should naturally be calibrated accordingly; discrimination of the fault will however be mediocre, and in practice unusable if we consider the tolerances of the components and especially of the supply voltage.

Such an arrangement may however be selected if capacitor $C_1$ is of a polarized electrolytic pattern and if we accept, in case of failure of the diode forming the rectifier Rd, risks of destruction of capacitor $C_1$ and of load X resulting respectively from their being put under reverse voltage and their overloading.

A preferred solution will be to form rectifier circuit Rd as shown in FIG. 4, from two diodes $D_4$ and $D_5$ connected in series, the common point of the two diodes being connected to a discriminator circuit T participating in the control of thyristor $Q_1$.

The voltage Vt, in relation to the supply line $L_2$, from the junction point of diodes $D_4$ and $D_5$, has in effect the following properties:

- if diodes $D_4$ and $D_5$ are in good condition, voltage Vt is formed only of positive half waves of the distribution network. This voltage is cancelled out during each negative half wave and presents a DC component;
- if diode $D_4$ is short circuited, voltage Vt is formed by the whole of the network voltage; it does not comprise any DC component;
- if diode $D_5$ is short circuited and if, furthermore, thyristor $Q_1$ is not triggered, voltage Vt is DC, possibly with a small ripple, and is not cancelled out at any moment.

Now, it can be arranged to form the control circuit T for the thyristor so that it is sensitive to these characteristics and particularly:

- to condition the production of the pulse for triggering thyristor $Q_1$ (and its synchronization) to the cancelling out of voltage Vt;
- to condition temporarily or permanently according to the type of use, the operation of control circuit T to the presence of a DC component in voltage Vt.

It will then be readily understood that in these conditions, a first failure by short circuit of one or the other diode $D_4$ or $D_5$ will interrupt the operation of the device.

FIG. 5 illustrates an embodiment of such a circuit provided with these characteristics, in the above mentioned case of a control and safety device for a heating apparatus.

In such an application, the flame, which presents a rectifying characteristic, as is well known, contributes to supplying a small current applied at If to the device. The above mentioned French patent No. 2 238 393 shows a means for reaching this result. This current charges a capacitor $C_3$ whose discharge is controlled by transistors $Q_2$ and $Q_3$ which form a flip-flop. The conduction of these transistors is controlled by the voltage Vt from rectifier circuit Rd, through components $R_3$, $R_4$, $D_6$.

During the positive half waves of the supply voltage, transistor $Q_3$ is maintained disabled because of the slightly positive base biasing voltage which is applied thereto. During this time, capacitor $C_3$ is charged by the current If.

When voltage Vt is cancelled out, at the beginning of the negative half wave of the supply voltage, transistor $Q_3$ is enabled and the flip-flop $Q_2Q_3$ rapidly discharges $C_3$ through resistor $R_5$.

It will be noticed that this operation is possible only as long as voltage Vt is capable of ensuring the synchronization thereof, which could not occur if diode $D_5$ is short circuited for Vt would remain at a substantially constant potential as has been explained.

Moreover, since the pulse generator circuit $Q_2Q_3$ is fed solely by the flame current If, it cannot, in the absence of this current, produce pulses spontaneously.

The pulse fed to $R_5$ is then transmitted to thyristor $Q_1$ through transistor $Q_4$ whose supply voltage is the average value of Vt, summarily filtered by circuit $R_6C_4$. Of course, transistor $Q_4$ becomes inactive and no longer transmits the pulse if the supply voltage is cancelled out, i.e. among other reasons if diode $D_4$ of rectifier circuit Rd is short circuited.

It will be noted that numerous failures or simply drifting of the components, though they do not directly prohibit production of the control pulse for thyristor $Q_1$, are likely to desynchronize the device, causing the energization of thyristor $Q_1$ during the positive half waves of the supply network, and so the blowing of fuse $F_1$.

Such would be the case particularly during avalanching of transistor $Q_4$.

Of course, the circuit described above requires adaptation to the conditions of use envisaged, and some additional components, which have not been mentioned, will generally be required to ensure the steady operation of the device at the lowest cost.

Similarly, this circuit, given by way of example, may be modified in numerous ways using the principles indicated while remaining in the scope of the invention.

FIG. 6 shows one of them, also envisaged for monitoring a burner, having several improvements, and where the discrimination of the absence of the short circuiting of diode $D_4$ (or of the presence of a DC component in voltage Vt) is operated differently.

The DC component of voltage Vt is, when it exists, filtered by circuit $R_7C_5$ to supply, in a known way, an integrator circuit $R_6C_4$. When a sufficient voltage for charging capacitor $C_4$ is reached, the flip-flop $Q_5Q_6$ is triggered and remains permanently conducting under the effect of the DC current supplied by $R_6$.

The charge previously accumulated in the capacitor $C_4$ is thereby applied to the pulse generator $Q_2Q_3C_3$, which allows it to deliver momentarily control pulses for thyristor $Q_1$, without a flame current If being present.

We thus achieve successively:

during charging of capacitor $C_4$ with the time constant $R_6C_4$ adjustable between wide limits, a so-called "pre-scavenging" phase during which forced ventilation of the hearth may be effected;

during discharge of capacitor $C_4$ into pulse generator $Q_2Q_3$ during which the excitation energy for load X (electromagnetic valve) is momentarily delivered, a so-called "ignition" phase. During this phase, the fuel supply electromagnetic valve is open and, simultaneously, an ignition system is actuated; preferably, the supply for the ignition system will be conditioned to the opening of the electromagnetic valve, for example if the lighter is fed from point A, by means of the alternating component of the voltage existing at this point when the electromagnetic valve is supplied.

If, during this ignition phase, a flame current If does not appear to take over from the discharge energy of capacitor $C_4$, it will be readily understood that the pulse generator will cease to operate and will definitively interrupt the ignition attempt.

Since the operating cycle which has just been described is conditioned to the presence of a DC component in the Vt voltage, it cannot occur in the opposite case, and particularly if diode $D_4$ is short circuited.

The pulse generator of FIG. 6, whose arrangement is slightly different from that of FIG. 5, delivers directly (to resistor $R'_5$) the pulse for triggering thyristor $Q_1$.

Certain improvements are furthermore shown in FIG. 6:

First and foremost, the purpose of capacitor $C_6$, which smoothes voltage Vt, is to avoid the appearance in voltage Vt of transitory interference which could result in the triggering of pulse generator $Q_2Q_3$ during the positive half waves of the supply voltage and thus cause the blowing of fuse $F_1$. This risk is in fact particularly to be feared, for such a device will be most frequently brought automatically into operation by the closure of a thermostatic contact; now, this type of switch, slow in action or with short contact travel, is predisposed to uneven operation (so-called "carboning up") during which fleeting interruptions of the supply voltage may occur, which would cause the appearance of a pulse triggering off thyristor $Q_1$ if a remedy were not provided.

Capacitor $C_6$, which may have only a low value, risks however delaying the zero return of voltage Vt and so the moment of triggering the pulse generator; so, a resistance $R_8$ of a high value may be provided for countering this effect.

Secondly, there is provided, in the diagram of FIG. 6, a second fuse $F_2$.

Fuse $F_1$ may in fact, to facilitate use of the heating installation, be made accessible to the user for its possible replacement; this facility will allow the down time of the heating installation to be reduced in the case of an occurence causing said fuse to blow.

However, since the user might use, deliberately or not, a fuse of unsuitable power, a second fuse $F_2$ is provided, which is not accessible to the user and which is of a greater power than the nominal power of fuse $F_1$.

Taking into account the considerable fault current which it is possible to provide in this device, it will be easy to stagger the powers and the speed of fuses $F_1$ and $F_2$ so that the energy required for blowing fuse $F_1$ at its nominal power does not cause fuse $F_2$ to blow, this latter being however capable, alone, of ensuring the protection of the device.

The same function could be provided by replacing fuse $F_2$ by a "fuse resistor", a component designed to blow in the case of overload, and which could moreover fulfill the function of limiting the charging current for capacitor $C_1$ (provided by resistor $R_2$ in FIG. 1).

As is evident, and as it follows moreover from what has gone before, the invention is in no wise limited to those of its modes of application and embodiments which have been more specially considered; it embraces, on the contrary, all variations thereof.

I claim:

1. A fail-safe control circuit, capable of transferring the electrical energy of a supply network as Ac voltage to an external load, of the type comprising a capacitor-reservoir charged periodically by the supply circuit and discharged similarly into the load by means of a controlled conduction member, wherein there are included:

rectifier means connected by a low resistance circuit to a first conductor of the supply network, which effect the charging of the capacitor-reservoir during a first polarity of the supply network;

means for controllably discharging the capacitor-reservoir into the load, incorporated in a low resistance circuit connecting the output of the rectifier means to a second conductor of the supply network;

at least one means of protection against overcurrents, acting by interruption of its electric conduction, inserted in one or the other of the conductors connecting to the supply network; and means for controlling the controlled discharge means of the capacitor-reservoir causing said discharge during the second polarity of the supply network in response to an external excitation; said circuit being furthermore arranged in order to produce, if there occurs a false energizing of the controlled discharge means of the capacitor-reservoir during the first polarity of the supply network, an overcurrent whose amplitude is independent of the load and for causing the interruption of the operation by the action of the protection means against excess currents.

2. The fail-safe control circuit as claimed in claim 1, operating in case of failure of the rectifier means, wherein the capacitor-reservoir is of the polarized electrolytic type.

3. The fail-safe control circuit as claimed in claim 1 or 2, wherein the rectifier means comprise at least two diodes disposed in series with the same orientation and the control means of the controlled discharge means are made sensible to the short circuiting of one or the other of the diodes to interrupt, at least temporarily, the production of the control signal for the controlled discharge means.

4. The fail-safe control circuit as claimed in claim 1, wherein it is further arranged that the interruption, at least temporary, of the production of the control signal for the controlled discharge means results from the modification of the wave form appearing between two consecutive diodes of the rectifier means following the reduction of the DC component and/or the attenuation of the AC component of said wave form.

5. The fail-safe control circuit as claimed in claim 4, wherein it is further arranged for the wave form appearing between two consecutive diodes of the rectifier means to be smoothed, by means of a capacitor, to reduce the amplitude of transitory parasitic phenomena brought by the supply network.

6. The fail-safe control circuit as claimed in claim 1, wherein the means for protection against excess currents comprise two fuses one of which, accessible to the user, is of a nominal power less than the second, which is made inaccessible to the user.

* * * * *